US007976381B2

(12) United States Patent
Schugar

(10) Patent No.: US 7,976,381 B2
(45) Date of Patent: Jul. 12, 2011

(54) METHOD TO DRIVE AN AUXILIARY WAGERING GAME USING A REELED SLOT MACHINE

(76) Inventor: David Steven Schugar, Crown point, IN (US)

( * ) Notice: Subject to any disclaimer, the term of this patent is extended or adjusted under 35 U.S.C. 154(b) by 1016 days.

(21) Appl. No.: 11/379,555

(22) Filed: Apr. 20, 2006

(65) Prior Publication Data

US 2007/0004498 A1 Jan. 4, 2007

Related U.S. Application Data

(63) Continuation-in-part of application No. 11/158,919, filed on Jun. 22, 2005, which is a continuation-in-part of application No. 10/754,587, filed on Jan. 12, 2004, which is a continuation-in-part of application No. 10/410,448, filed on Apr. 10, 2003, now Pat. No. 7,294,054, said application No. 11/379,555 is a continuation-in-part of application No. 10/874,558, filed on Jun. 24, 2004, now Pat. No. 7,354,343, and a continuation-in-part of application No. 10/688,898, filed on Oct. 21, 2003, now Pat. No. 7,163,458, said application No. 11/379,555 is a continuation-in-part of application No. 10/754,587, filed on Jan. 12, 2004, and a continuation-in-part of application No. 10/410,448, filed on Apr. 10, 2003, now Pat. No. 7,294,054, and a continuation-in-part of application No. 10/688,898, filed on Oct. 21, 2003, now Pat. No. 7,163,458.

(60) Provisional application No. 60/726,628, filed on Oct. 13, 2005, provisional application No. 60/745,263, filed on Apr. 20, 2006, provisional application No. 60/548,481, filed on Feb. 26, 2004.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ................................ 463/25; 463/20; 463/26

(58) Field of Classification Search .................... 463/20, 463/25, 26

See application file for complete search history.

(56) References Cited

U.S. PATENT DOCUMENTS

| | | | | |
|---|---|---|---|---|
| 6,033,307 | A * | 3/2000 | Vancura | 463/20 |
| 6,224,483 | B1 * | 5/2001 | Mayeroff | 463/20 |
| 6,896,264 | B1 * | 5/2005 | Haber | 273/274 |

* cited by examiner

*Primary Examiner* — David L Lewis
*Assistant Examiner* — Adetokunbo Torimiro
(74) *Attorney, Agent, or Firm* — Muskin & Cusick LLC

(57) ABSTRACT

A method, apparatus, and computer readable storage to drive an auxiliary game using resultant reel stops on a slot machine. Reel stops can have an action or property associated with them which affects the auxiliary game. When a player spins reels on the slot machine, the player can win a standard prize based on a resulting combination of symbols displayed on the slot machine and the player can also win an auxiliary prized based on the auxiliary game which can be controlled, in whole or in part, by where the reels stop.

7 Claims, 9 Drawing Sheets

METHOD TO DRIVE AN AUXILIARY WAGERING GAME USING A REELED SLOT MACHINE

CROSS REFERENCE TO RELATED APPLICATIONS

This application claims priority/benefit to provisional application No. 60/726,628 filed on Oct. 13, 2005, which is incorporated by reference herein in its entirety. This application also claims priority/benefit to provisional application No. 60/745,263, filed on Apr. 20, 2006, which is incorporated by reference herein in its entirety. This application is also a continuation in part of application Ser. No. 11/158,919, filed on Jun. 22, 2005, entitled, "Wagering Game With Player Banking of Positive Expectation Situations," which is a continuation in part of application Ser. No. 10/754,587, filed on Jan. 12, 2004, entitled, "Casino Games Directed to Betting on Progressions," which is a continuation in part of application Ser. No. 10/410,448, filed on Apr. 10, 2003, now U.S. Pat. No. 7,294,054 entitled, "Wagering Method, Device, and Computer Readable Storage Medium, for Wagering on Pieces in a Progression," all three of which are incorporated by reference herein in their entireties for all purposes. This application is also a continuation in part of application Ser. No. 10/874,558, filed on Jun. 24, 2004, now U.S. Pat. No. 7,354,343 entitled, "Wagering Game Where Player Can Borrow Money for Wagers Based on Equity Position" which is incorporated by reference in its entirety for all purposes and 1) derives priority from the provisional patent application entitled, "Wagering Game Where Player Can Borrow Money Based on Positive Expectation," filed on Feb. 26, 2004, Ser. No. 60/548,481, which is incorporated by reference herein in its entirety for all purposes and 2) is also Continuation in Part (CIP) of patent application Ser. No. 10/688,898, filed on Oct. 21, 2003, now U.S. Pat. No. 7,163,458 entitled, "A Casino Game for Betting on a Bidirectional Linear Progression," which is incorporated by reference herein in its entirety for all purposes.

This application is also a direct continuation in part of application Ser. No. 10/754,587, filed on Jan. 12, 2004, entitled, "Casino Games Directed to Betting on Progressions," which is incorporated by reference herein in its entirety. This application is also a direct continuation in part of application Ser. No. 10/410,448, filed on Apr. 10, 2003, now U.S. Pat. No. 7,294,054 entitled, "Wagering Method, Device, and Computer Readable Storage Medium, for Wagering on Pieces in a Progression," which is incorporated by reference herein in its entirety. This application is also a direct continuation in part of patent application Ser. No. 10/688,898, filed on Oct. 21, 2003, now U.S. Pat. No. 7,163,458 entitled, "A Casino Game for Betting on a Bidirectional Linear Progression," which is incorporated by reference herein in its entirety for all purposes. This paragraph is added in view of proposed 71 Fed. Reg. 48.

BACKGROUND OF THE INVENTION

1. Field of the Invention

The present invention is directed to a method, apparatus, and computer readable storage for implementing an auxiliary game associated with a reeled slot machine. The reeled slot machine can drive the auxiliary game by affecting outcomes of the auxiliary game.

2. Description of the Related Art:

Bonus games on slot machines add some excitement and personality to standard reeled slot machines. Typically a bonus game is triggered by an infrequent event during play of the slot game and is separate from the slot game.

A disadvantage of standard bonus games is that they occur after a standard reeled slot has finished playing but are not directly related to the standard reel outcomes. What is needed is a way to create synergy between a reeled slot game and an associated secondary game.

SUMMARY OF THE INVENTION

It is an aspect of the present invention to provide a wagering game which can be exciting to players.

The above aspects can be obtained by a method that includes (a) associating individual reel stops with actions for an auxiliary game; (b) receiving a wager from a player; (c) spinning reels on the slot machine to resultant reel stops; (d) awarding a combination award based on a combination of the resultant reel stops; (e) using respective actions for the resultant reel stops to affect the auxiliary game; and (f) awarding an auxiliary award based on an outcome of the auxiliary game.

The above aspects can also be obtained by a method that includes (a) displaying a series of locations; (b) outputting a direction to move a marker; (c) moving the marker to a location based on the direction; (d) displaying a first award amount to be won if the marker reaches a first location and displaying a second award amount to be won if the marker reaches a second location; (e) updating the first award amount and/or the second award amount; and (f) repeating the displaying, outputting, moving, displaying, and updating until the marker reaches the first location or the second location.

The above aspects can also be obtained by a method that includes (a) receiving a wager from a player; (b) spinning reels on a slot machine; (c) implementing an auxiliary game; and (d) if an auxiliary award is issued on the auxiliary game, then using all or part of the auxiliary award to continue spinning reels on the slot machine.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
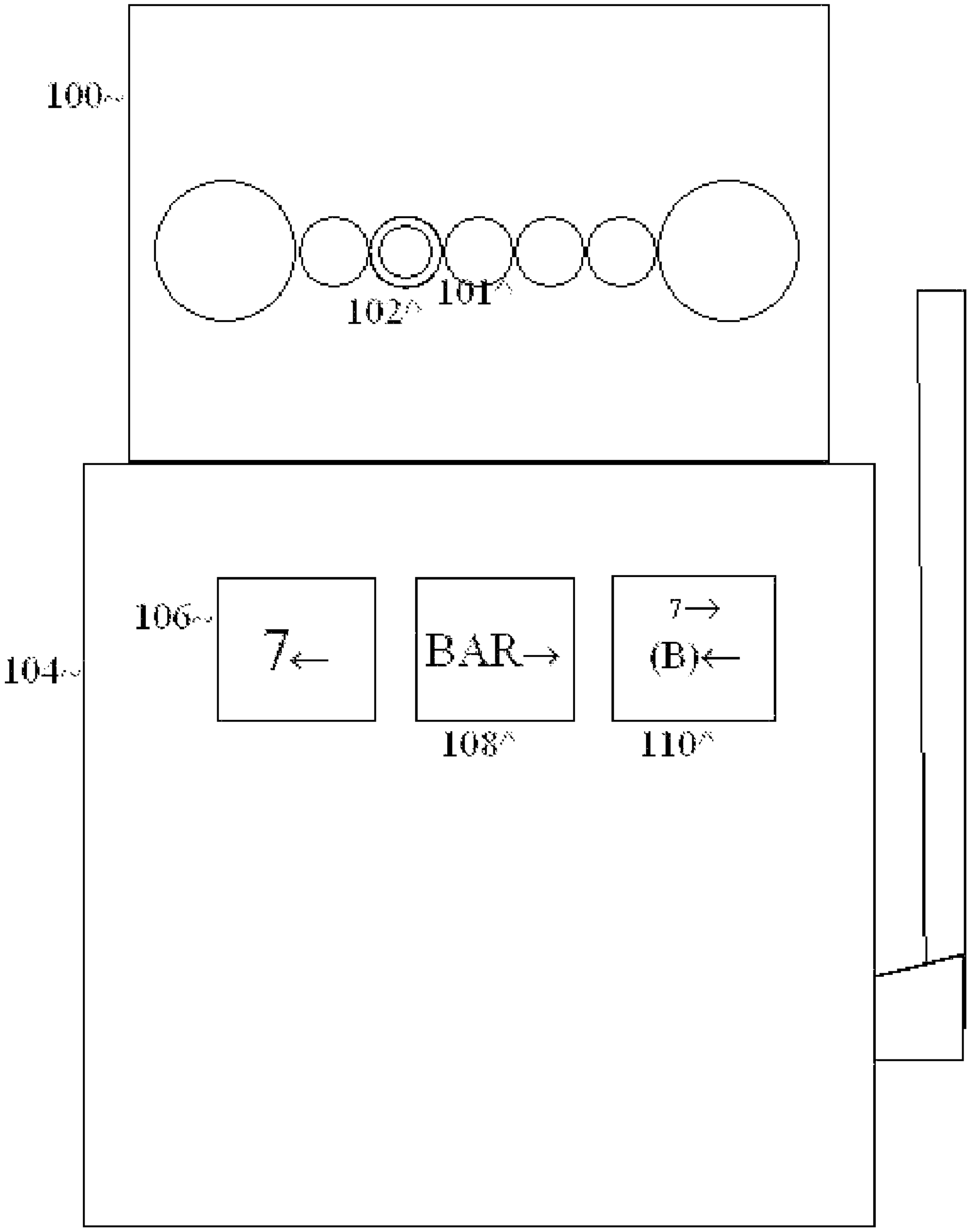
FIG. 1 is an example of a slot machine with an auxiliary game, according to an embodiment.

Reference will now be made in detail to the presently preferred embodiments of the invention, examples of which are illustrated in the accompanying drawings, wherein like reference numerals refer to like elements throughout.

The present general inventive concept relates to a method, system, and computer readable storage to implement a wagering game. More particularly, a standard reeled slot game can be used to drive an auxiliary game. An auxiliary game can be a game that can award awards to a player separate from the typical combination awards on a reeled machine. The auxiliary game can be displayed on a separate area than the reels and may have its own rules, outputs, etc.

FIG. 1 is an example of a slot machine with an auxiliary game, according to an embodiment.

A slot machine 104 contains a first reel display 106 a second reel display 108 and a third reel display 110. It is noted that any number of reels can be used, such as 4, 5, etc. When a player places a wager and spins the reels, each reel stops at a resultant reel stop. In this example, the first resultant reel stop is a '7' symbol, the second resultant reel stop is 'bar' symbol, and the third resultant reel stop is a blank (designated by '(B)' symbol).

An auxiliary game 100 can be displayed alongside the main slot machine outputs. The auxiliary game can take many forms, illustrated is merely one example. The auxiliary game illustrated is a bidirectional linear progression game as described in the patent application 10/688,898. The auxiliary game 100 output includes a center spot 101 and a puck 102 which is located on the spot directly to the left of the center spot 101.

As described herein, the outputs (or resultant symbol(s) which are the symbol(s) which the reel stops on and is displayed to the player) on the reel display(s) 106, 108, 110, can be used to determine outcomes of the auxiliary game 100. This can be antageous in that using the reel displays to drive the outcome of the auxiliary game can serve to tie the main slot game and the auxiliary game together so there is a synergy between the two games.

Figure 2:
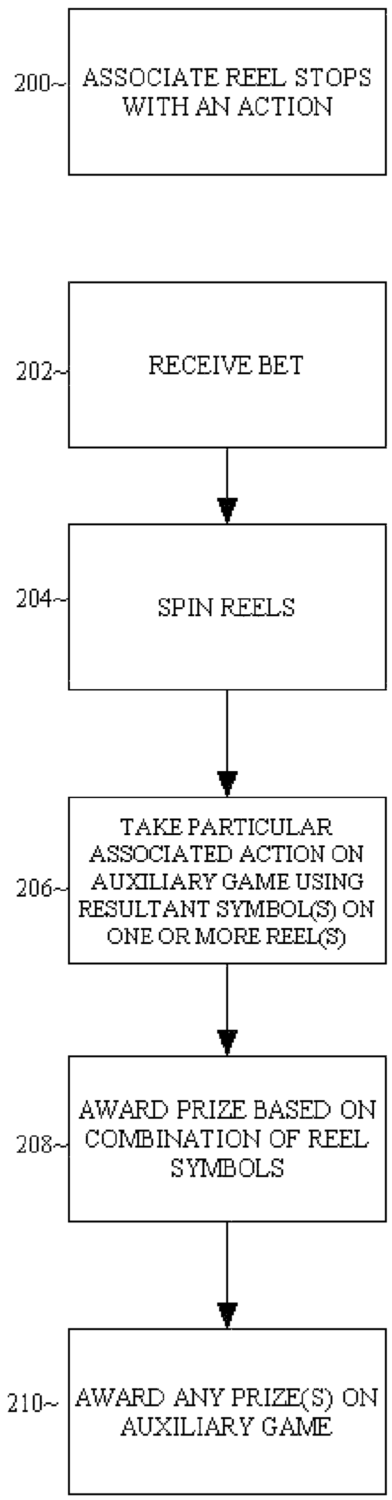
FIG. 2 is a flowchart illustrating an exemplary method of driving an auxiliary game using resultant reel symbol(s), according to an embodiment.

FIG. 2 is a flowchart illustrating an exemplary method of driving an auxiliary game using resultant reel symbol(s), according to an embodiment.

In operation 200, reel stops are associated with an action. This is done with the design of the machine. For example, particular reel stops can trigger particular actions. A reel stop can be considered to encompass both the displayed symbol and its associated action. Table I below illustrates an exemplary list of reel stops and associated actions.

TABLE I

| stop # | symbol | associated action |
|---|---|---|
| 1 | 7 | left |
| 2 | blank | right |
| 3 | cherry | left |
| 4 | blank | right |
| 5 | cherry | left |
| 6 | blank | right |
| 7 | bar | left |
| 8 | blank | right |
| 9 | bar | left |
| 10 | blank | right |
| 11 | cherry | left |
| 12 | blank | right |

Thus, in the example in Table I, there are 12 reel stops on this reel, each reel stop has an association action, in this example a direction to be taken in the auxiliary game. Thus, for example, if a player spins the reels and the resulting combination on the three reels is "7/blank/bar"(reel stop 1/reel stop 10/reel stop 7), then the associated actions to be taken in the auxiliary game would be left/right/left. Thus, instead of using a random number generator to determine which direction the puck will move), a resultant reel stop can be used to determine the direction. Thus, in this example, the puck (or indicator, marker, etc.) would move left, then right, then left. In addition to association reel stops or symbols with left and right directions, other directions or actions can be used as well. For example, up, down, card values, dice values, or any other value that can be input into an auxiliary game. A particular symbol(s), or reel stop(s), or reel background color(s), etc., or any combination of these, can have an auxiliary action associated with it. In a further embodiment, a video reel can use each symbol from left to right (and successively from top to bottom) to trigger an associated action.

In operation 202 of the method, the machine can receive a bet.

From operation 202, the method can proceed to operation 204, which spins the reels.

From operation 204, the method can proceed to operation 206, which takes a particular associated action on the auxiliary game using the resultant symbol(s) on one or more reels. Thus, when each reel stops spinning, an associated action is triggered from each reel stop, and this action is transmitted to a processor implanting the auxiliary game which takes a respective action.

From operation 206, the method can proceed to operation 208, which awards a prize based on a combination of reel symbols. For example, if the player gets 7/7/7, the player will win the award associated with this combination.

From operation 208, the method can proceed to operation 210, which awards a prize(s) based on the auxiliary game. Thus the player has two games to win prize(s) on, the main reeled slot game, and the auxiliary game.

In some cases, there may be a need for more actions to be determined for the auxiliary game than there are reels on the slot machine. For example, a game may need 4 determinative actions but if a three reeled slot game is used, then additional reel spin(s) may be needed. Thus, reels can be spun conditionally if needed to continue to drive the auxiliary game.

As an example of an implementation of a method as described in FIG. 2, consider a 3 reel slot game with reels as illustrated in Table I. An auxiliary game is a bidirectional linear progression with five spots (−2, −1, 0, +1, +2). The left winning area is to the left of −2 (e.g. −3), and the right winning area is to the right of +2 (e.g. +3). The puck starts at 0. If the puck reaches the left winning area or the right winning area the player wins a prize (e.g. $20). Thus, in this example, in order to reach either side with only three reels each reel must be associated with the same direction. Thus, consider a spin of this game wherein the results are stops: 1, 3, 4 (7, cherry, blank). The puck will move left (to −1), left (to −2), and then right (to −1). Thus, in this example, the auxiliary game has not won anything. In a further example, consider a spin of this game wherein the results are stops: 3, 5, 11 (cherry cherry cherry). The puck will move left (to −1), left (to −2), and left (to −3 or the left winning area). Thus, in addition to winning the combination award of cherry cherry cherry, the player also wins for reaching the left winning area. In a further embodiment, particular symbols (e.g. a '7') can be a wild symbol and can allow the player to determine which direction the puck will move (e.g. the player can enter which direction the puck would move into the machine).

Figure 3:
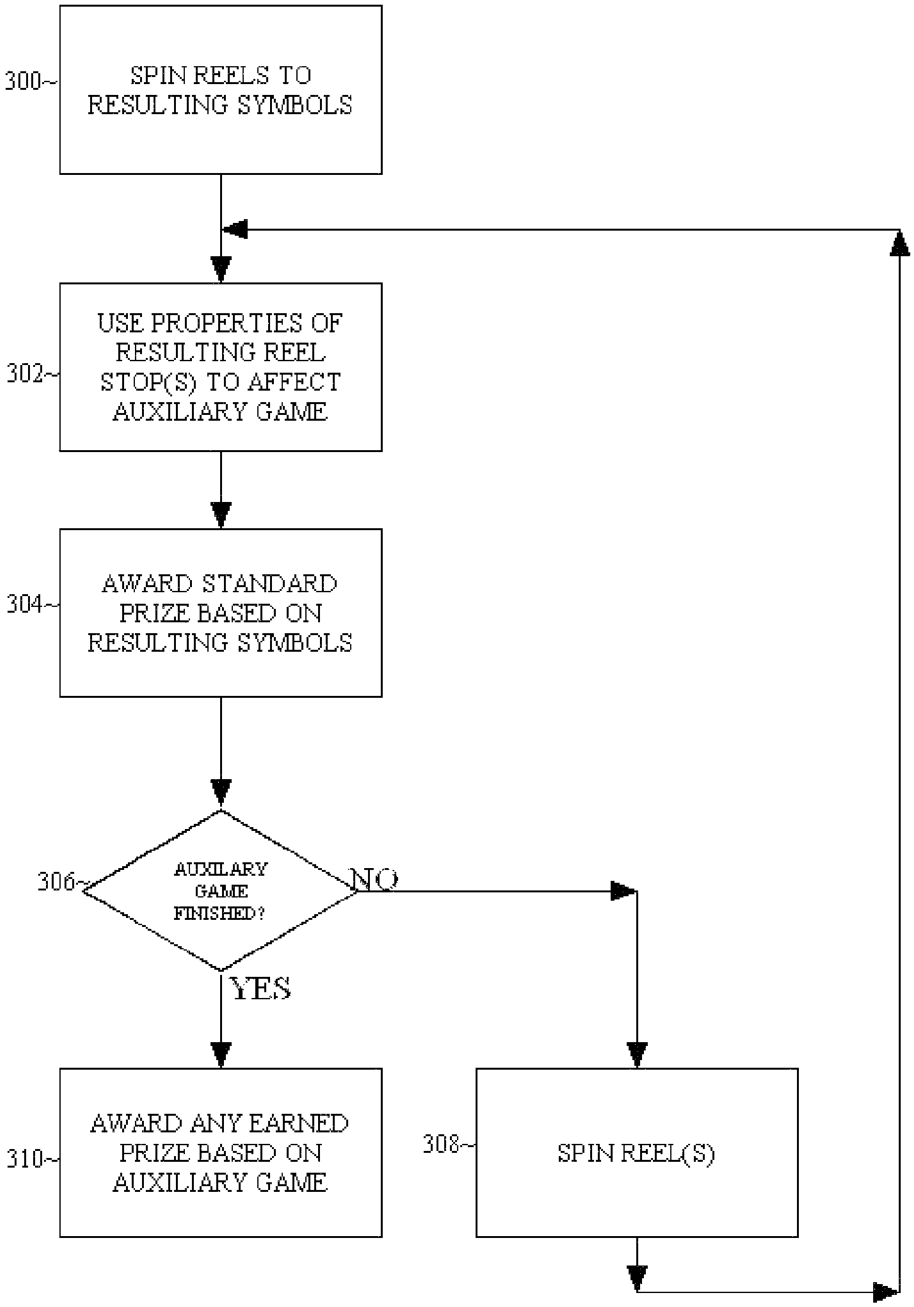
FIG. 3 is a flowchart illustrating an exemplary method of conditionally spinning reel(s) on a slot machine to drive an auxiliary game, according to an embodiment.

FIG. 3 is a flowchart illustrating an exemplary method of conditionally spinning reel(s) on a slot machine to drive an auxiliary game, according to an embodiment;

The method can start with operation which spins reels to resultant symbols (a particular reel stop for each reel).

From operation 300, the method can proceed to operation 302, which uses properties of each respective resultant reel stop to affect the auxiliary game. For example, a reel stop can be associated with a particular action for the auxiliary game (see operation 200 from FIG. 2). The auxiliary game can take an action based on this property.

From operation 302, the method can proceed to operation 304, which awards a standard prize based on a combination of the resulting symbols (displayed on the respective reel stops) on the main slot game.

From operation 304 the method can proceed to operation 306, which determines whether the auxiliary game is finished. If the auxiliary game is finished, then the method can proceed to operation 310 which awards any prize earned on the auxiliary game.

If the determination in operation 306 determines that the auxiliary game is not finished, then the method can proceed to operation 308 which continues to spin one or more reels on the slot machine. The method can then continue to operation 302, which uses the properties of the resulting reel stops (from operation 308) to affect the auxiliary game. The method can continue as described herein, with the one exception that operation 304 may or may not be optional after the method passes through operation 308. After the first standard prize is awarded (in operation 304), depending on the embodiment being implemented, additional prizes for resulting symbols displayed on the slot machine may or may not be awarded.

As an example of an implementation of a method as described in FIG. 3, consider a 3 reel slot game with reels as illustrated in Table I. An auxiliary game is a bidirectional linear progression with five spots (−2, −1, 0, +1, +2). The left finish area is to the left of −2 (e.g. −3), and the right finish area is to the right of +2 (e.g. +3). The puck starts at 0. If the puck reaches the left finish area the auxiliary game is over (and the player does not win anything), while if the puck reaches the right finish area then the player wins the auxiliary game (e.g. wins $20 or any amount). Thus, consider a spin of this game (operation 300) wherein the results are stops: 1, 3, 4 (7, cherry, blank). The combination (7, cherry, blank) does not comprise a winning combination and thus the player does not receive a combination award (operation 304). The puck will move (operation 302) left (to −1), left (to −2), and then right (to −1). Thus, in this example, the auxiliary game is not over yet (since the puck has not reached either side), so operation 306 determines the auxiliary game is not yet finished and thus proceeds to operation 308 which spins the reels again. On this spin the result is reel stops: 7, 9, & 8 (bar, bar blank), which moves (operation 302) left/left/right (from Table I). Since the puck was already on the −1 position, the puck moves to the left to −2, and then the puck moves to the left again to the left finish area, wherein the auxiliary game is now over (operation 306) and in which the player wins nothing (operation 310). The player also wins nothing for the combination of bar/bar/blank, since in this example this would not be a winning combination (operation 304).

A bonus round or auxiliary game can be based on a bidirectional linear progression game as described in the Ser. No. 10/688,898 document. This can be implemented electronically as a standard bonus game which is triggered by a predetermined condition and then the bonus round is funded automatically (since by virtue of triggering the bonus round a prize is awarded). For example, if the player gets three "bonus game" symbols in a row, the bonus round can be triggered with an allotted predetermined amount (e.g. $50). In a further embodiment, an auxiliary game based on a bidirectional linear progression game can be driven (via the method illustrated in FIG. 2 and/or FIG. 3) using displayed resultant reel stops to determine which direction to move the puck.

Money earned from a slot combination award (e.g. for example the player gets three 7's, etc.) can be used to fund an auxiliary game.

Figure 4A:
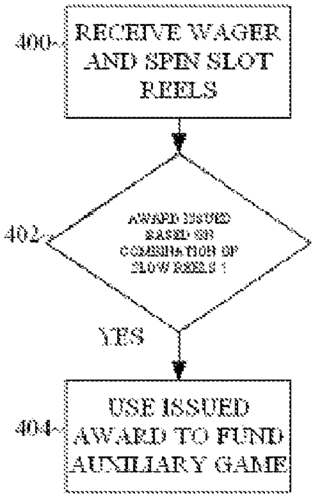
FIG. 4A is a flowchart illustrating an exemplary method of using a combination award to fund an auxiliary game, according to an embodiment.

FIG. 4A is a flowchart illustrating an exemplary method of using a combination award to fund an auxiliary game, according to an embodiment.

The method can start with operation 400, wherein a machine receives a wager and spins slot reels.

The method can proceed to operation 402, which determines if an award is issued based on a combination of the resultant symbols on the slot reels.

If the determination in operation 402 determines that an award is issued based on the combination of resultant symbols of the slot reels, then all or some of that award can be used to fund an auxiliary game. Thus, for example, if the player has won $100, then $10 (e.g. 10%) can be used for the auxiliary game which can then be used to increase the player's award on the auxiliary game. For example, an auxiliary game can have a 50/50 chance of winning an amount used to enter the auxiliary game. So if the player wins $100 on a combination of the main reels, and then 10% goes towards the auxiliary game, the player plays the auxiliary game with $10 and thus has a 50% chance of winning another $10 (for a total of $20) or losing the $10.

In another embodiment, money earned on an auxiliary game can be used to play the slot game which awards prizes for receiving particular combinations of symbols.

Figure 4B:
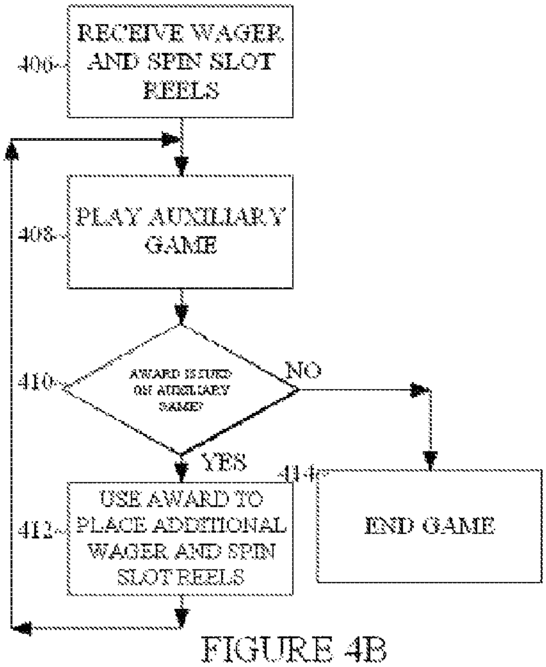
FIG. 4B is a flowchart illustrating an exemplary method of using an award earned on an auxiliary game to play a reeled slot game, according to an embodiment.

FIG. 4B is a flowchart illustrating an exemplary method of using an award earned on an auxiliary game to play a reeled slot game, according to an embodiment.

The method can start with operation 406, which receives a wager and spins slot reels.

The method can then proceed to operation 408, wherein plays an auxiliary game. This can be done as described herein. The auxiliary game may or may not be driven using resultant reel stops.

From operation 408, the method can proceed to operation 410, which determines whether an award is issued on the auxiliary game. If an award is not issued on the auxiliary game, then the method may proceed to operation 414 which ends the current game. Alternatively, the method can still further spin slot reels and return to operation 408.

If the determination in operation 410 determines that an award has been issued in the auxiliary game, then the method can proceed to operation 412, which may use the award to place an additional wager on the reeled slot aspect of the game (e.g. to achieve particular combinations of symbols) and further spin the reels. The method can then return to operation 408 which further plays the auxiliary game. Alternatively, the method can proceed to operation 414, which can end the game, depending on terminating conditions of the slot game and/or the auxiliary game (e.g. after a certain number of iterations the auxiliary game automatically ends and the entire game is over).

An example of the embodiment illustrated in FIG. 4B can be as follows. The player wagers $1 in a standard slot machine (operation 406). The player loses the spin, but the auxiliary game is still triggered automatically (operation 408). 10% of his initial spin ($1) can go towards an auxiliary game ($0.10). If the auxiliary game is a 5% chance of resulting in 20 times win of the amount put towards the auxiliary game, then if the player loses the wager then the auxiliary game is over (operation 414), and the slot round is over as well (e.g. the player will have to start a brand new game). If the player has won the auxiliary wager (operation 412) ($2.00), then a portion of this (e.g. $1) can go towards another slot pull, thus the player now gets $1 which goes into his or her credit meter and the reels spin again automatically (this is where the extra $1 has gone).

In a further embodiment, both money earned from a slot combination award (e.g. for example the player gets three 7's, etc.) can be used to fund an auxiliary game and money also earned on an auxiliary game can be used to play the slot game which awards prizes for receiving particular combinations of symbols.

Figure 4C:
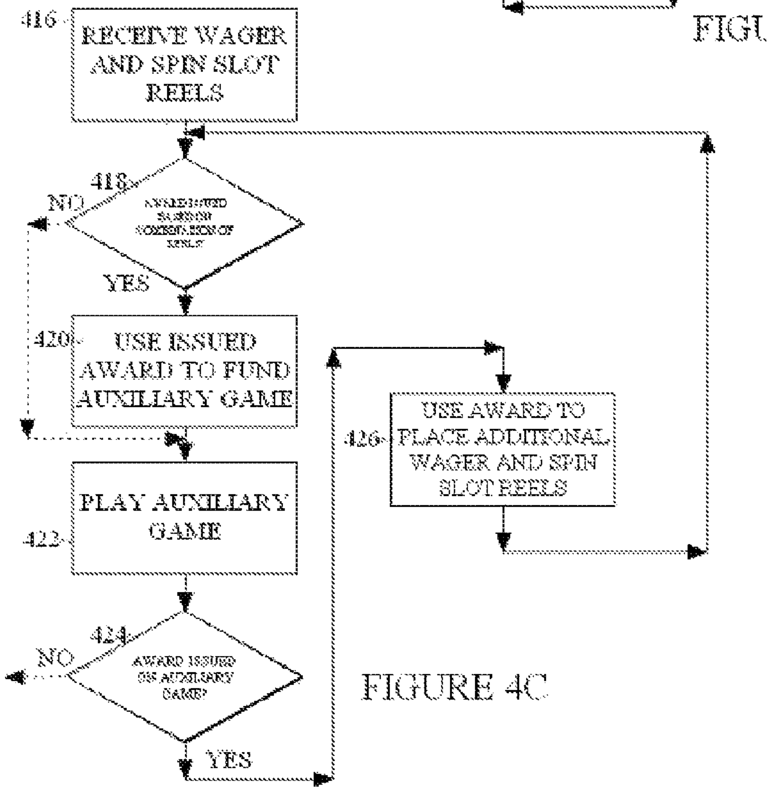
FIG. 4C is a flowchart illustrating an exemplary method of both using a combination award to fund an auxiliary game and using an award earned on an auxiliary game to play a reeled slot game, according to an embodiment.

FIG. 4C is a flowchart illustrating an exemplary method of both using a combination award to fund an auxiliary game and using an award earned on an auxiliary game to play a reeled slot game, according to an embodiment;

The method can begin with operation 416 which receives a wager and spins slot reels. As with operations 400 and 406, a wager received can be solely for the slot portion of the game or a portion of the wager can also be apportioned to go towards the auxiliary game.

From operation 416 the method can proceed to operation 418, which determines whether an award is issued based on the combination of displayed reels. If no such award is earned, then either the game may end (not pictured) or the game can still proceed to operation 422 which plays an auxiliary game (illustrated as a dotted line).

If the determination in operation 418 determines that an award is issued based on the combination of displayed reels, then the method can proceed to operation 420 which uses all or some (e.g. a fixed amount or a percentage) of the award earned to go towards the auxiliary game. For example, awards on the auxiliary game can be increased based on an amount that goes towards the auxiliary game. For example, if $10 goes towards the auxiliary game, awards on the auxiliary game can be increased by 25%. The money can also go towards a pool which allows the player to wager on events inside the auxiliary game (as described herein).

From operation 420, the method can proceed to operation 422, which then plays the auxiliary game. The auxiliary game can be played to completion or only a segment of the auxiliary game can be played (e.g. one move can be made).

From operation 422, the method can proceed to operation 424, which determines whether an award has been issued on the auxiliary game. If no award has been issued on the auxiliary game, then the entire game may end (according to the game rules, this is not illustrated in FIG. 4C). Alternatively, if no award has been issued on the auxiliary game, then the reels may continue to spin (either for free or requiring additional money by the player) and the method can return to operation 418.

If the determination in operation 424 determines that an award has been issued in the auxiliary game, then the method can proceed to operation 426, which uses the auxiliary award to place an additional wager on the reeled portion of the game and the slot reels can be spun again. The method can then return to operation 418, which continues the method as described herein. If there is no award issued on the auxiliary game, then the game can end (not pictured). It is noted that an "award" can also just be a free spin with no monetary value. Thus in operation 424 (and any other operation), an award does not have to include (although of course it can) a cash award but can just be a free spin.

An example of the embodiment illustrated in FIG. 4C can be as follows. The player wagers $1 in a standard slot machine (operation 416). The player wins $100 based on the symbol combinations from the spin, so the auxiliary game is still triggered automatically (operation 418). Note that alternatively, the auxiliary game does not have to be triggered by a monetary win on the reels but a particular combination(s) may in itself trigger the auxiliary game without a cash award to the player. If the player has earned a $100 award on the reel combination, then 10% of the award ($10) can go towards an auxiliary game ($10). If the auxiliary game has a 10% chance of resulting in 10 times win of the amount put towards the auxiliary game (operation 420), then after the auxiliary game (or step or portion of the auxiliary game) is executed (operation 422), if the player loses the wager then the auxiliary game is over, and the slot round is over as well (e.g. the player will have to start a brand new game). If the player has won the auxiliary wager (e.g. $100.00 win), then a portion of this can go towards another slot pull (operation 426) and the method can continue.

Of course please note that all of the examples described above are for illustrative purposes only, and any type of auxiliary games can be used.

According to particular games rules, the game can terminate upon any condition at any operation illustrated in FIG. 4. For example, terminating conditions can be: if the reels are spun a certain number of times, if the player has not won any wager, if the auxiliary game has been triggered a certain number of times, if the player has won/lost the auxiliary game and thus the auxiliary game as terminate, etc.

Figure 5:
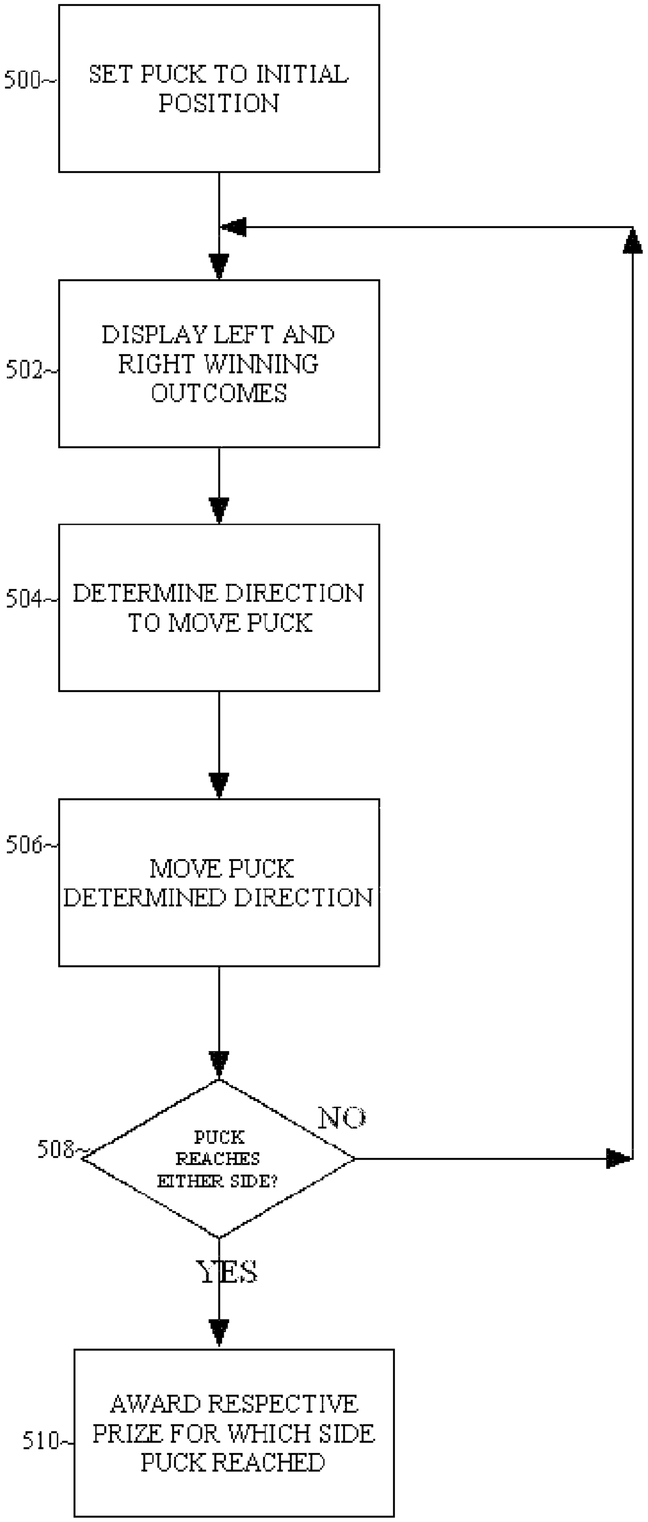
FIG. 5 is a flowchart illustrating an exemplary method of a non-interactive auxiliary game, according to an embodiment.

FIG. 5 is a flowchart illustrating an exemplary method of a non-interactive auxiliary game, according to an embodiment.

The method can begin with operation 500, which sets puck to an initial position. This can, for example, be a center position.

From operation 500, the method can proceed to operation 502, which displays left and right winning outcomes. If the puck reaches a left side the player will win a left award amount, and if the puck reaches a right side then the player will win a right award amount.

The left and right winning outcomes can be determined in numerous ways. For example, they can be determined using a table of puck positions. For example, a table can store all possible paths the puck can take, and at each point on the path, a respective left and right award amounts.

Another method that can be used to determine the left and right award amounts is to assign an initial value to each side (e.g. $20), and each the puck moves, a bet (e.g. $5) can be placed on the side furthest from the puck. As a bonus game triggered by an infrequent condition, the player may typically not place this bet himself or herself, but the bet is placed by virtue that the player has earned entrance into the bonus round and thus has earned an award which is distributed via placing these left/right bets each time the puck moves. The payouts for each bet placed can be determined as described in the Ser. No. 10/688,898 document.

From operation 502, the method can continue to operation 504, which determines which direction to move the puck. If this method is implementing an independent bonus round triggered by an infrequent reel combination not driven by reel outcomes, then a random number generator can be used to determine which direction to move the puck.

If this method is implementing an auxiliary game using displayed reel stops to driver the auxiliary game, then instead of a random number generator, the direction the puck moves can be determined by the resultant reel stop.

From operation 504, the method can proceed to operation 506, which moves the puck in the determined direction.

From operation 506, the method can proceed to operation 508, which determines whether the puck has reached either side (ending the auxiliary or bonus game). If the puck has not reached either side, then the method can return to operation 502 which continues the game.

If the determination in operation 508 determines that the puck has reached either side, then the method can proceed to operation 510, which awards the respective prize to the player depending on which side the puck has reached.

FIGS. 6A-6D illustrate an example of one round of the bonus game. Of course, this is just an example, and many others (essentially infinite if not limited somehow by the game designers) sequences of the bonus round can occur as well.

Figure 6A:
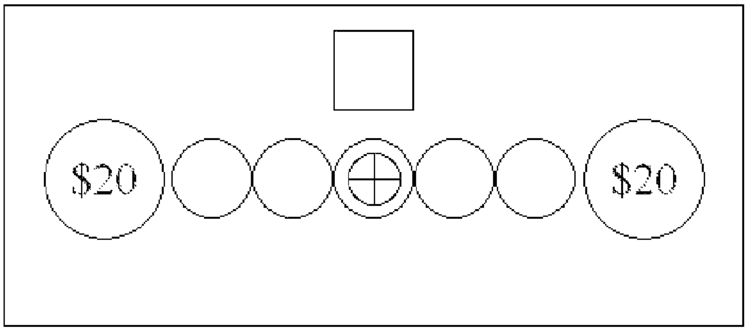
FIG. 6A is an exemplary output of a first state of a non-interactive auxiliary game, according to an embodiment.

FIG. 6A is an exemplary output of a first state of a non-interactive auxiliary game, according to an embodiment.

The first state has the puck in the initial position (center), and the left award amount is $20 and the right award amount is $20.

Figure 6B:
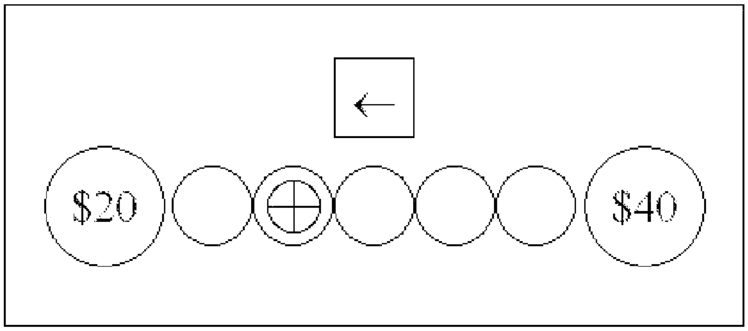
FIG. 6B is an exemplary output of a second state of a non-interactive auxiliary game, according to an embodiment.

FIG. 6B is an exemplary output of a second state of a non-interactive auxiliary game, according to an embodiment.

From the first state, the game determines to move the puck left, so the puck is now in position two (out of five) and the left award amount is $20 and the right award amount is $40. The right award amount is $40 because a $5 bet on the right side from position two results in an additional award of $20 if the puck were to indeed reach the right side (again, see the Ser. No. 10/688,898 document for a discussion of the math).

Figure 6C:
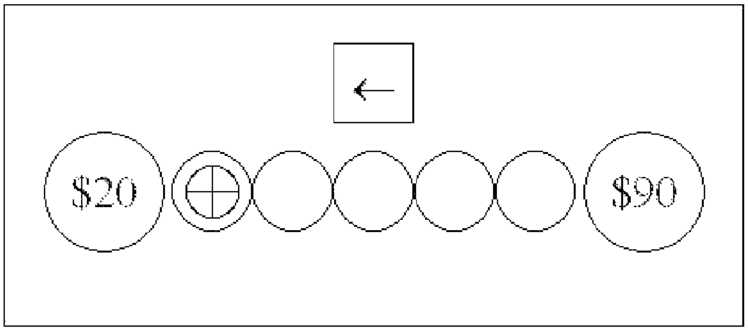
FIG. 6C is an exemplary output of a third state of a non-interactive auxiliary game, according to an embodiment.

FIG. 6C is an exemplary output of a third state of a non-interactive auxiliary game, according to an embodiment.

The game again moves the puck to the left, and now the left award amount is $20 and the right award amount is $90.

Figure 6D:
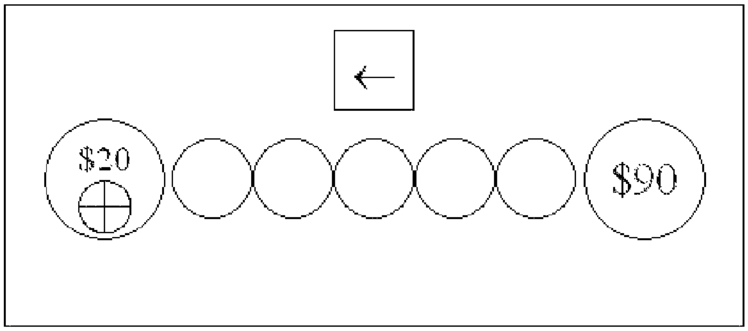
FIG. 6D is an exemplary output of a fourth state of a non-interactive auxiliary game, according to an embodiment.

FIG. 6D is an exemplary output of a fourth state of a non-interactive auxiliary game, according to an embodiment.

The game again moves the puck to the left, awarding the player the left award amount of $20. The bonus/auxiliary game is now over. Of course the player would have hoped that the puck would move to the right as opposed to the left, thereby increasing the awards even further and putting the puck closer to the right side which has a higher award amount than the left side.

In the example previously presented, the bet was automatically placed on the side furthest to the puck. In a further embodiment, an interactive method can be implemented, in which the player can choose which side to place the wager on.

Figure 7:
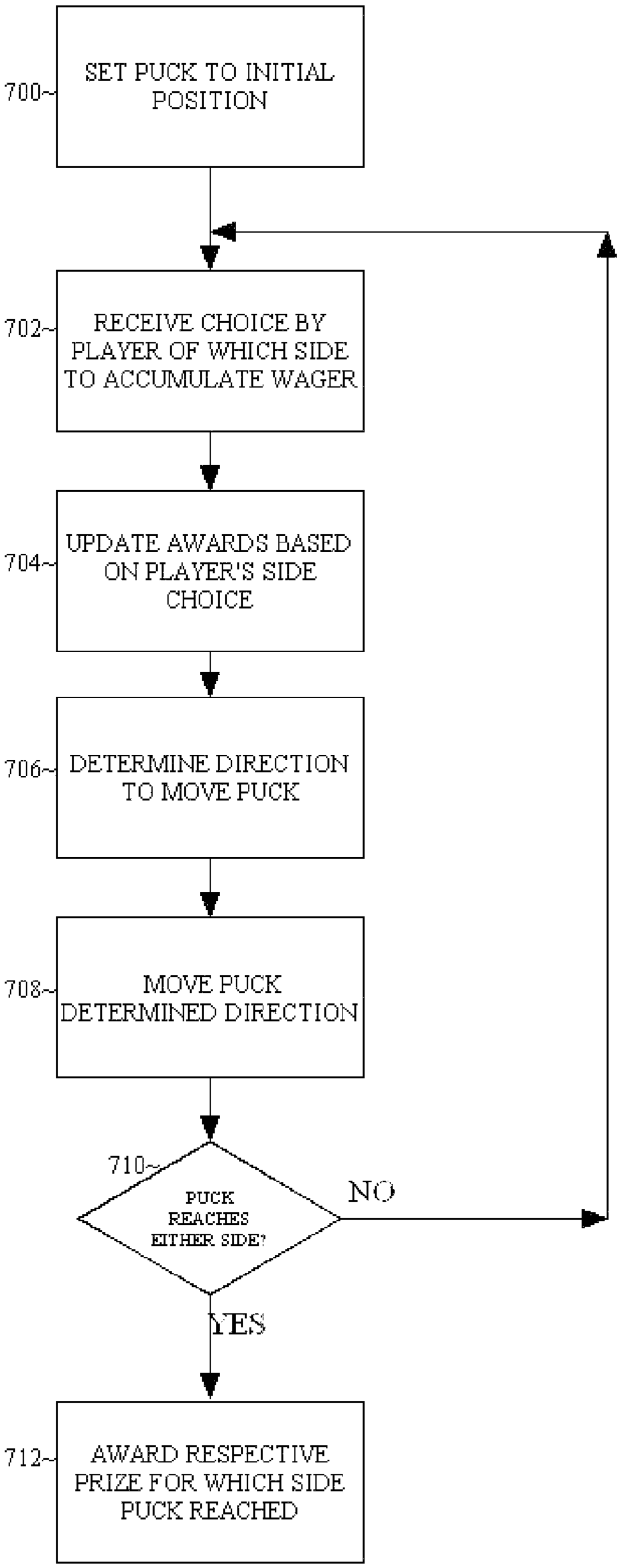
FIG. 7 is a flowchart illustrating an exemplary method of an interactive auxiliary game, according to an embodiment.

FIG. 7 is a flowchart illustrating an exemplary method of an interactive auxiliary game, according to an embodiment.

The method can begin with operation 700, which sets the puck to an initial position (such as the center).

The method can then proceed to operation 702, which receives a choice by the player of which side to place a wager on. The player can be presented with a choice of the left side or the right side, and also the amounts by which the left award and the right award will increase based on the player's choice.

From operation 702, the method can proceed to operation 704, which updates the left and/or right award based on the player's choice.

From operation 704, the method can proceed to operation 706, which determines which direction to move the puck. This can be determined either by a random number generator, or can also be determined by a resultant reel stop as illustrated in FIG. 2.

From operation 706, the method can proceed to operation 708, which moves the puck in the determined direction from operation 706.

From operation 708, the method proceeds to operation 710, which determines whether the puck has reached either side. If the puck has not reached either side, then the method can return to operation 702.

If the determination in operation 710 determines that the puck has reached either side, then the bonus/auxiliary game is typically over and the method can proceed to operation 712, which awards to the player the respective prize depending on which side the puck has reached.

FIGS. 8A-8F illustrate an exemplary round of an interactive bonus or auxiliary game. Of course this is just one example, and an infinite number of different games can occur (unless the house limits a number of times the puck can move to avoid a game of infinite length).

Figure 8A:
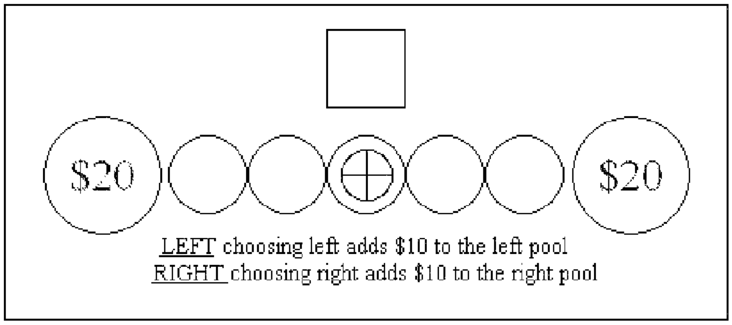
FIG. 8A is an exemplary output of a first state of an interactive auxiliary game, according to an embodiment.

FIG. 8A is an exemplary output of a first state of an interactive auxiliary game, according to an embodiment.

The game can start with an award amount for each side (e.g. $20), and the player can be presented with a side choice in which to place an additional bet. In this case, the player can click 'LEFT' which adds $10 to the left award (the left pool), or the player can click 'RIGHT' which adds $10 to the right award (the right pool). In this example, the player clicks 'RIGHT' which adds $10 to the right award.

Figure 8B:
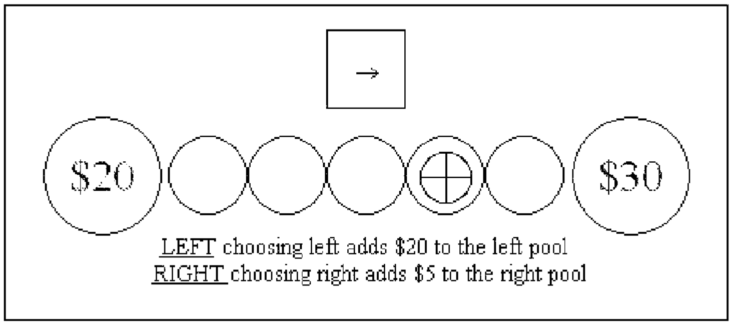
FIG. 8B is an exemplary output of a second state of an interactive auxiliary game, according to an embodiment.

FIG. 8B is an exemplary output of a second state of an interactive auxiliary game, according to an embodiment.

The left pool is $20 and the right award is now $30 (since the player clicked 'RIGHT' in the first game state). The puck has moved to the right. Now the puck is in position four (out of five) and the player can click 'LEFT' to add $20 to the left award and can click 'RIGHT' to add $5 to the right award. Of course the addition to the right award is smaller than the addition to the left award since the chances of the puck reaching the right award is greater than reaching the left award. In this example, the player now clicks 'LEFT.'

Figure 8C:
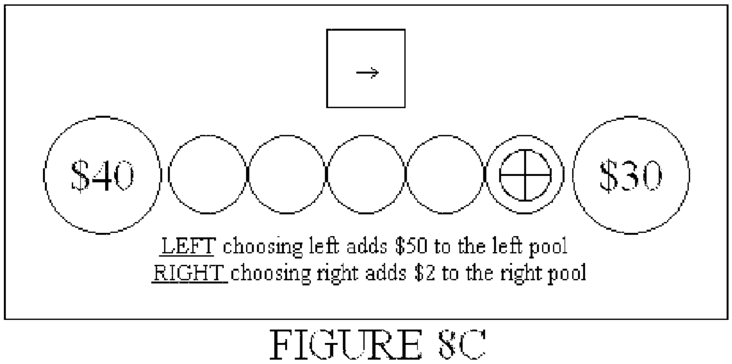
FIG. 8C is an exemplary output of a third state of an interactive auxiliary game, according to an embodiment.

FIG. 8C is an exemplary output of a third state of an interactive auxiliary game, according to an embodiment.

The left award is now $40 (since the player clicked 'LEFT' in the prior state) and the right award is $30. The puck now moves to the right. The player can choose the left side which will add $50 to the left award or the player can choose the right side which will add $2 to the right award. The player chooses the left side.

Figure 8D:
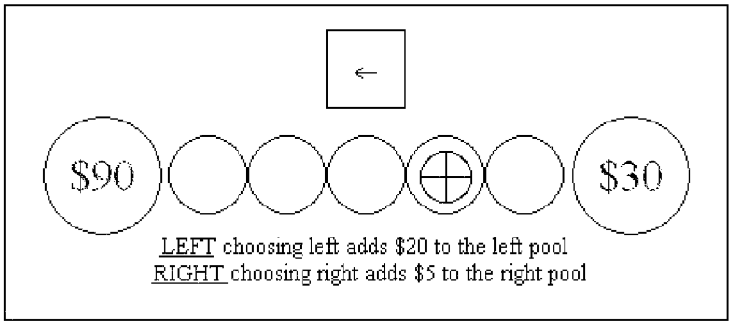
FIG. 8D is an exemplary output of a fourth state of an interactive auxiliary game, according to an embodiment.

FIG. 8D is an exemplary output of a fourth state of an interactive auxiliary game, according to an embodiment.

The left award is now $90 (since the player clicked 'LEFT' in the prior state) and the right award is $30. The puck now moves to the left. The player can choose the left side which will add $20 to the left award or the player can choose the right side which will add $5 to the right award. The player chooses the left side.

Figure 8E:
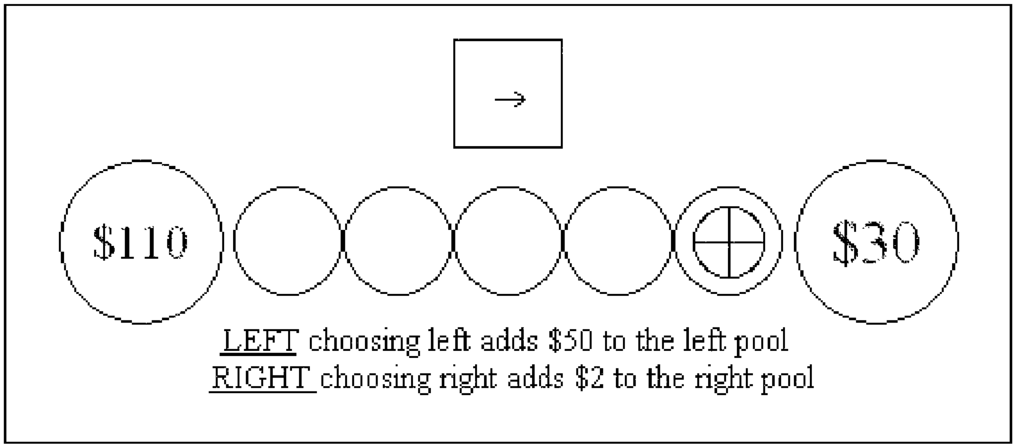
FIG. 8E is an exemplary output of a fifth state of an interactive auxiliary game, according to an embodiment.

FIG. 8E is an exemplary output of a fifth state of an interactive auxiliary game, according to an embodiment.

The left award is now $110 (since the player clicked 'LEFT' in the prior state) and the right award is $30. The puck now moves to the right. The player can choose the left side which will add $50 to the left award or the player can choose the right side which will add $2 to the right award. The player chooses the right side.

Figure 8F:
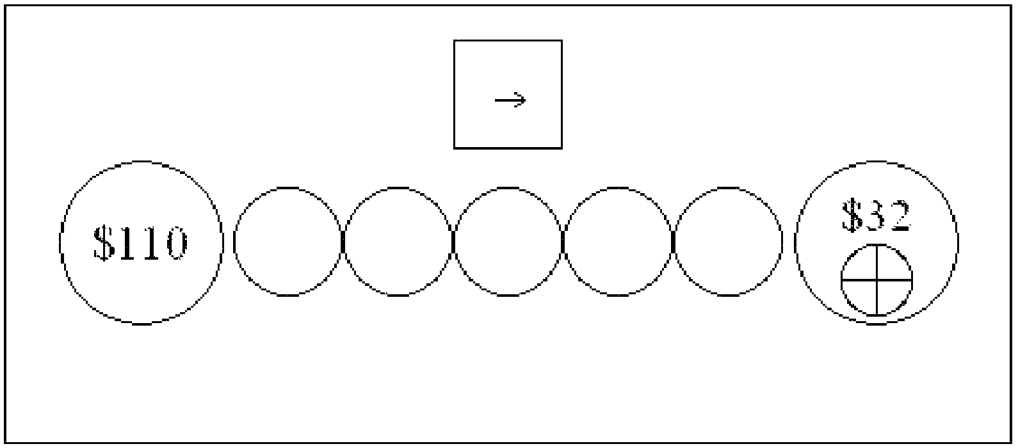
FIG. 8F is an exemplary output of a sixth state of an interactive auxiliary game, according to an embodiment.

FIG. 8F is an exemplary outputofa sixth state of an interactive auxiliary game, according to an embodiment.

The left award is now $110 and the right award is $32 (since the player clicked 'RIGHT' in the prior state). The puck now moves to the right. The puck has now reached the right side and the bonus/auxiliary game is over. The player wins the right award amount of $32. Of course the player would have preferred if the puck traveled to the left side so that the player would win the larger award.

It is noted that any of the operations described herein can be performed in any sensible order. Further, any operations may be optional. Also, any feature or embodiment described herein (which includes any document incorporated by reference) can be combined with any other (including any document incorporated by reference).

The many features and advantages ofthe invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method to play a slot machine, the method comprising:

a processing unit operating with an output device, the processing unit executing instructions to perform the following operations:

providing a set of at least two different actions for an auxiliary game, the set of actions comprising moving an icon in a left direction and moving the icon in a right direction;

associating individual reel stops on reels on the slot machine with a respective direction from the set;

receiving a wager from a player;

spinning the reels on the slot machine to resultant reel stops;

awarding any earned combination award based on a combination of the resultant reel stops;

moving the icon in the auxiliary game in a direction associated with at least one of the resultant reel stops;

maintaining a state of the auxiliary game and conducting a second spin by repeating the receiving, spinning, awarding, and moving; and further awarding an auxiliary award if earned, based on a position of the icon in the auxiliary game, wherein the auxiliary game is displayed on an output device that is different than the reels.

2. The method as recited in claim 1, further comprising: if the auxiliary game is not completed, then continuing to spin the reels on the slot machine to further resultant reel stop(s) and moving the icon in a direction associated with at least one of the further resultant reel stop(s).

3. The method as recited in claim 1, wherein the auxiliary game is a bidirectional linear progression game.

4. The method as recited in claim 1, wherein a portion of the wager is allocated to a game awarding the combination award and a portion of the wager is allocated to the auxiliary game.

5. The method as recited in claim 1, wherein the wager is entirely allocated to a game awarding the combination award and the auxiliary game is funded by any winnings from a winning combination.

6. The method as recited in claim 1, wherein if the auxiliary award is issued on the auxiliary game, then using all or part of the auxiliary award to continue spinning reels on the slot machine.

7. The method as recited in claim 6, wherein if a combination award is awarded based on a combination of displayed reels on the slot machine, then using all or part of the combination award to fund the auxiliary game.

* * * * *